United States Patent
Wilson

(12)
(10) Patent No.: US 6,542,111 B1
(45) Date of Patent: Apr. 1, 2003

(54) PATH PREDICTION FOR VEHICULAR COLLISION WARNING SYSTEM

(75) Inventor: Terry B. Wilson, Chandler, AZ (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 09/928,544

(22) Filed: Aug. 13, 2001

(51) Int. Cl.[7] .............................. G01S 13/00; B60T 7/16; B62D 1/24
(52) U.S. Cl. ............................ 342/70; 342/72; 180/168; 180/169
(58) Field of Search ............ 342/70, 71; 356/3.01–5.15; 180/168, 169

(56) References Cited

U.S. PATENT DOCUMENTS 5,343,206 A * 8/1994 Ansaldi et al. ............... 342/70
5,751,211 A * 5/1998 Shirai et al. .................. 340/435
6,081,223 A * 6/2000 Kitahara et al. ............... 342/70
6,198,426 B1 * 3/2001 Tamatsu et al. ............... 342/70
6,300,865 B1 * 10/2001 Fechner et al. ............. 340/436

* cited by examiner

*Primary Examiner*—Thomas H. Tarcza
*Assistant Examiner*—Brian K Andrea
(74) *Attorney, Agent, or Firm*—Rader, Fishman & Grauer PLLC

(57) ABSTRACT

A motor vehicular collision warning system including a scanned beam sensor, a signal processor, and a vehicle interface system that initiates warnings to the driver or adaptively controls the vehicle. Scene data is used to predict the path of the roadway in front of a subject vehicle. Reflections from manmade and natural scene objects are extracted from the scene data to define a linear feature edge. Once the feature edge is determined, the predicted path of the subject vehicle can be determined using information regarding the vehicle trajectory and the feature edge.

5 Claims, 2 Drawing Sheets

PATH PREDICTION FOR VEHICULAR COLLISION WARNING SYSTEM

BACKGROUND OF THE INVENTION

This invention relates to path prediction for a motor vehicle collision warning system.

The present construction is directed towards a motor vehicular collision warning system which includes a scanned beam sensor, a signal processor, and a vehicle interface system that initiates warnings to the driver or adaptively controls the vehicle. In this forward looking collision warning system, the sensor is designed to project a narrow beam of energy toward objects in the forward field of view. The detection system is suitable for collision warning for notifying a driver of an impending collision or initiating evasive action to avoid a collision or providing adaptive cruise control, braking, and the like that actively adjust the vehicle speed to maintain a time headway relative to the closest in path vehicle.

It is known to detect the distance between a vehicle and another in path vehicle and warn a driver so as to avoid collision between the vehicles. To provide such control, it is necessary to discriminate between the closest in path vehicle and the plurality of other vehicles that may be ahead of the vehicle having collision warning capability. One technique for providing discrimination includes a radar unit that emits a radar wave forward of the vehicle so as to detect objects existing in front of the vehicle. Using this technique, it is possible to detect the closest in path vehicle from other vehicles.

A common approach for forward looking collision warning systems is to detect objects in the forward field of view based upon vehicle size criteria. One of the reasons for using this technique is the result of the difficulty in obtaining high resolution with known collision warning systems. However, the known techniques for "macro" detection and discrimination can result in false alarms that affect the driver's perception of the system and can potentially negate the driver's reliance on the system thereby limiting the overall accident prevention effectiveness of the system.

Another issue related to object discrimination is the knowledge of the predicted path for the vehicle. This is critical in the classification of in path and out of path objects. Path prediction may be performed using a separate vision based or location based sensor system which adds to the overall cost and complexity of the complete system.

Therefore, it is an object of the present invention to avoid the aforementioned disadvantages and problems associated with existing vehicular collision warning systems.

SUMMARY OF THE INVENTION

In accordance with this invention, data from a forward looking radar system is used to predict the path of the roadway in front of a vehicle. Reflections from roadside objects such as trees, bushes, light poles, fire hydrants, and the like are extracted. The data is then used to define a linear feature edge for the roadway. After the feature edge of the roadway is determined, the predicted path of the vehicle can be determined using this information as well as information regarding the vehicle trajectory.

The present invention provides improved performance for a forward looking collision warning system by extraction and path prediction using small amplitude, non-vehicular, object data. The scene is processed by extracting the small amplitude, non-vehicular, object data. Objects are then combined to form a linear feature edge that is equivalent to the roadway feature edge. Examples of the small amplitude, non-vehicular, objects include telephone poles, streetlights, trees, bushes, curbs, fences, and the like. These small amplitude, non-vehicular, objects follow the path of the roadway. By combining them in linear, straight or curved, trajectories, the predicted path of the roadway can be estimated. Further, a comparison of the offset from the detected feature edge and the center line or trajectory of the vehicle allows the predicted forward path to be determined. The feature edge is used to exclude objects that would not represent a collision threat such as those at the entry and exit points of curves which are normally problematic with respect to providing false warnings to the driver. The predicted forward path also includes the lane of travel of the vehicle when adaptive cruise control is desired.

The present invention utilizes a high resolution imaging type forward looking radar system to extract secondary objects from the received data. The radar apparatus is provided with a rotatable antenna structure such as a slotted wave guide antenna. The antenna is driven to oscillate back and forth at an angle of 10° or less in each direction. A transceiver is coupled to the antenna and the antenna passes transmitted and reflected radar signals to and from a target as it is oscillated back and forth. The scanned signals are directed to a processor and then to a vehicle interface system for initiating warnings to the driver or adaptively controlling the vehicle.

Thus, the present invention predicts the path of the roadway in front of the vehicle by extracting scene data from the radar return. The processed data defines a linear feature edge which is combined with information regarding the vehicle trajectory to determine the predicted path of the vehicle.

The foregoing and other advantages and features of the invention will be more apparent from the following description when taken in connection with the accompanying drawings.

DETAILED DESCRIPTION OF A PREFERRED EMBODIMENT

Figure 1:
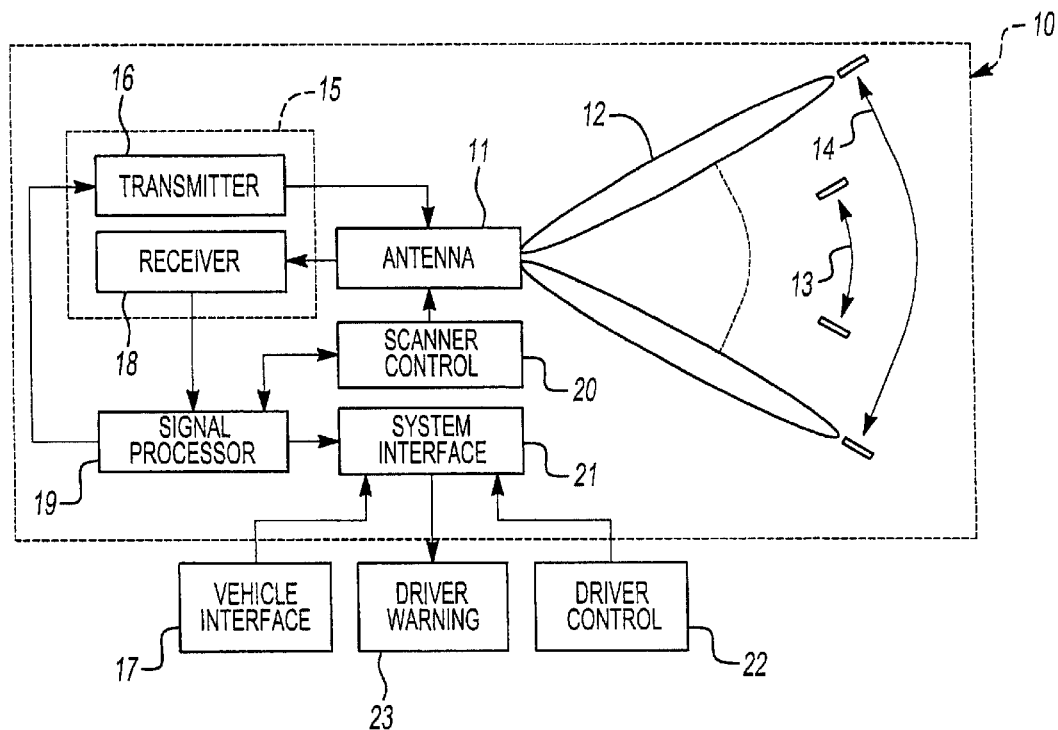
FIG. 1 is an illustration of one embodiment of the present invention including a forward looking vehicular collision warning system having a scanning sensor beam, a signal processor used to detect objects, and a vehicle interface.

FIG. 1 illustrates one embodiment of a forward looking vehicular collision warning and adaptive control system 10. System 10 is mounted at a front portion of a traveling vehicle for emitting a forward signal, such as a radar wave, from the vehicle and also receiving a reflected wave from an obstacle, such as another vehicle. If the system detects an object directly in front of the traveling vehicle, it automatically activates an alarm or adaptively controls the vehicle by, for example, activating a brake to supply a braking force to the vehicle's wheels.

The vehicular collision warning system 10 notifies the driver of an impending collision or initiates evasive action to avoid a collision or actively adjusts the vehicle speed to maintain a time headway to the closest in path object. Warnings may be visual, auditory, or tactile and the vehicle control actions may include braking, throttle control, transmission control, and evasive steering.

The forward looking collision warning system 10 of the present invention is provided with a rotatable antenna structure 11 which may be in the form of a slotted wave guide antenna. Antenna 11 is driven to oscillate back and forth at a predetermined angle in each direction. The antenna 11 both emits and detects radio frequency energy as it is transmitted to and reflected from a target. The antenna has a defined beam width in both azimuth and elevation. Further, the antenna 11 has a specific directivity or gain and the ability to point the resultant beam to specific locations within the forward field of view.

As illustrated in FIG. 1, antenna beam 12 includes both a left most and right most azimuth location as it is scanned. Numeral 13 illustrates that antenna 11 is scanned across a field of view from left to right or right to left. Numeral 14 shows the limits of the scanned beam in azimuth.

A transceiver 15 is coupled to the antenna for allowing the antenna to transmit and receive signals as the antenna is oscillated back and forth. The transceiver 15 consists of a transmitter 16 and a receiver 18 which, together, develop the radio frequency energy that is sent to the antenna 11 and received from the antenna. The transmitter 16 creates the radio frequency energy upon command from the signal processor 19 and sends this energy to the antenna 11. The receiver 18 processes the radio frequency energy received by the antenna 11 into a usable form so that the signal processor 19 can extract object information.

The signal processor 19 controls the transmission of directed radio frequency energy to the transmitter 16 and extracts the desired information from the receiver 18. Signal processor 19 also interfaces with the remaining portions of the system 10. For example, the motion of the antenna beam 12 is controlled in a precise manner by scanner control 20. Feedback from the scanning position is provided to the signal processor 19 to allow proper registering of the received data relative to the geometry of the scanning position.

The system interface 21 provides an interface with systems outside the control system 10. Vehicle interface 17 provides the status of various relevant information from the vehicle. Further, commands to the vehicle from control system 10 are communicated from system interface 21 to vehicle interface 17. Similarly, certain predetermined perimeters are communicated to the system interface 21. System interface 21 receives perimeters from driver control 22 that relate to configuration of operation of the control system 10. Feedback from control system 10 is communicated through system interface 21 to driver warning or display 23.

Figure 2:
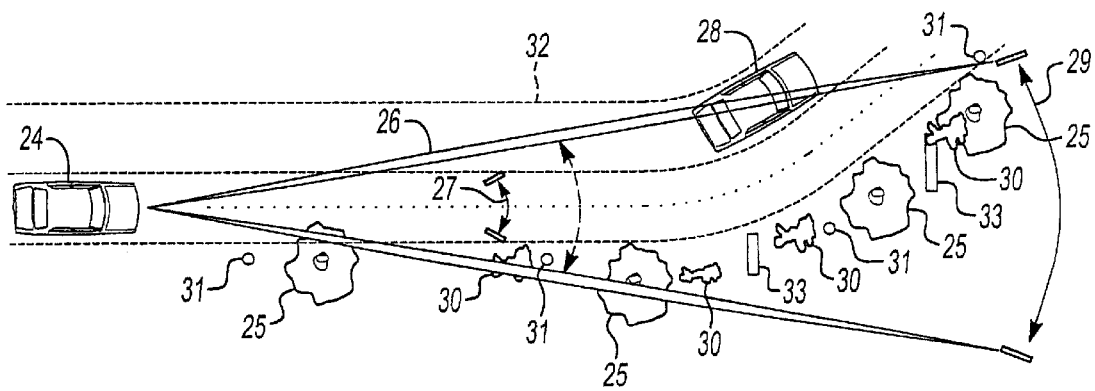
FIG. 2 is an illustration of one embodiment of an environment wherein the present invention may be used.

Referring now to FIG. 2, a traveling vehicle 24 having a vehicular collision warning system 10 of the present invention is illustrated. As described previously, the collision warning system 10 emits a forward signal, such as a radar wave, from vehicle 24 and also receives a reflected wave from an obstacle, such as another vehicle 28, which is driving towards or away from vehicle 24. System 10 measures the distance between the traveling vehicle 24 and the other vehicle 28. If the system detects an object in front of the traveling vehicle 24, it automatically activates an alarm or adaptively controls the vehicle by, for example, activating a brake to supply a braking force to the vehicle's wheels.

Within the field of view for the traveling vehicle 24 (element 14 in FIG. 1 and element 29 in FIG. 2), there are numerous scene objects. For example, trees 25 may be detected within the antenna beam 26 (element 12 in FIG. 1). However, these medium to large natural objects may not be as large as a typical vehicle 28. Moreover, during scanning 27 (element 13 in FIG. 1), several small natural objects, such as bushes, shrubs, rocks, and the like, can be detected. Again, these small natural objects 30 are significantly smaller than a typical vehicle 28.

Referring to FIG. 2, other objects 31, including light poles, posts, and fire hydrants, are part of a typical scanned scene that is detectable by antenna 11. The object data in the scene is further complicated by other objects 33, including signs or mailboxes. As vehicle 24 travels, the intended trajectory 34 for vehicle 24 is intended to be within the lane markings 32. As previously described, the collection of objects within the intended trajectory of the traveling vehicle 24 includes a plurality of small to large natural and man-made objects that are detectable by antenna 11 but are not another vehicle 28.

Figure 3:
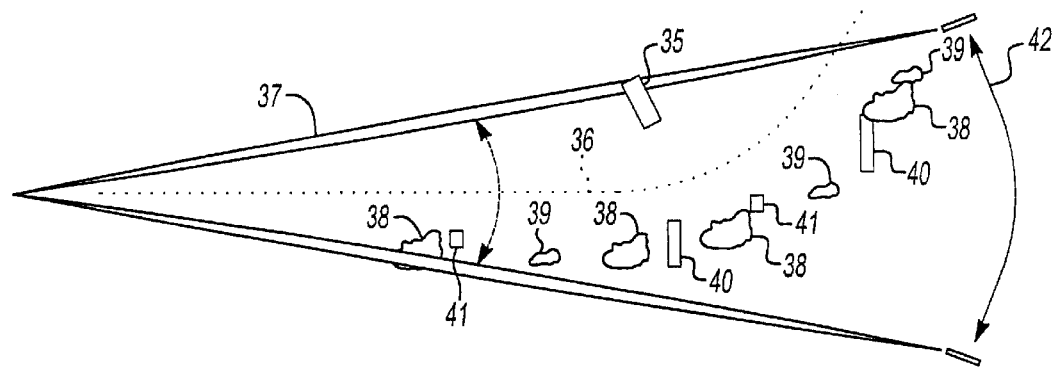
FIG. 3 illustrates a resultant sensor return profile from the scene illustrated in FIG. 2.

Referring now to FIGS. 1 and 3, the signal processor 19 commands the transmitter 16 at an appropriate time to emit radio frequency in a specific pattern to allow detection of objects 38, 39, 40, and 41 within the field of view 42 of antenna beam 37. The transmitted energy is directed from antenna 11 as a predetermined beam 12 with a predetermined scan pattern 13. The directed energy reflects from objects within the field of view 42 (FIG. 3) and returns to the antenna 11. This received energy is communicated to receiver 18 where it is converted into a form usable by the signal processor 19.

Signal processor 19 monitors the type of antenna beam 12 being used by means of scanner control 20. This allows the formation of an image of each object 38, 39, 40, and 41 in the field of view 42 (FIG. 3). One or more radio frequency energy samples are taken at each antenna beam location as the antenna 11 is oscillated across the field of view 42 (FIG. 3).

The sensed object data from the scene is processed and certain scene data is extracted from the received information in the signal processor 19. The extracted data includes reflections from the small and large roadside objects such as trees, bushes, light poles, fire hydrants, and the like (elements 38, 39, 40, and 41). The resultant processed and extracted data signal is transmitted through the system interface 21 as a driver warning 23 or information to the vehicle interface 17. Status information regarding the vehicle is received by the signal processor 19 through the system interface 21 from driver control 22 and vehicle interface 17. The entire process is periodically repeated to make continuous scans of the forward field of view 42.

FIG. 2 depicts two lanes of traffic with a traveling vehicle 24 moving towards another vehicle 28. The two lanes of traffic are separated by lane markings 32. Further, the anticipated trajectory 34 of the traveling vehicle 24 is illustrated along with various roadside objects including trees (25), signs (33), light poles (31), and bushes (30). As described previously, control system 10 detects the man-made and natural objects (38, 39, 40, and 41) in addition to the vehicle objects (28).

FIG. 3 illustrates a depiction of the sensor data that is returned from the scene shown in FIG. 2. For reference, the antenna beam 37, field of view 42, and anticipated trajectory 36 of the vehicle 24 are shown. These items are not detected by control system 10 but provide a frame of reference for the path prediction methodology used in the present invention.

Within the field of view 42 (FIG. 3), the radar is able to detect objects 38, 39, 40, and 41 as well as vehicles 35. Each detected object has a signal to noise ratio that is proportional to the reflectivity of the object. While vehicles (35) are made of metal and reflect radio frequency energy easily, other manmade and natural objects (38, 39, 40, and 41) reflect energy based on their size, composition, and position relative to antenna 11. The control system herein contemplates that the range and angle extent is extracted for each object 38, 39, 40, or 41.

Figure 4:
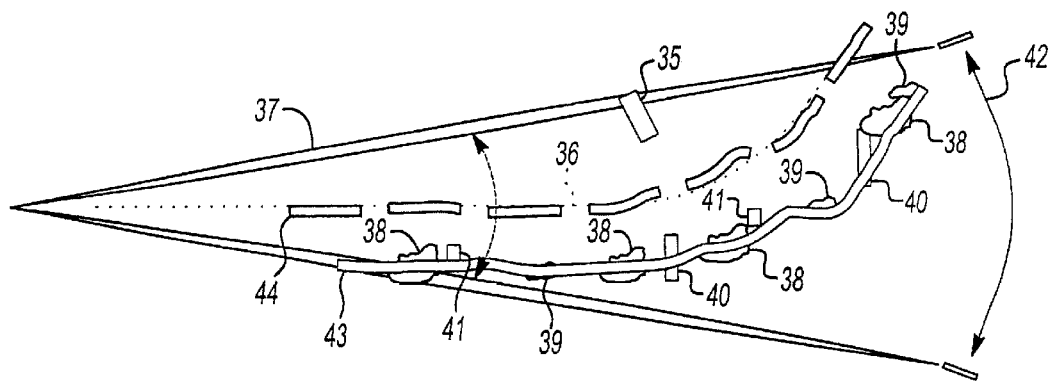
FIG. 4 illustrates the path prediction from the sensor return profile of FIG. 3.

Referring more specifically to FIG. 4, a depiction of the sensor data that is returned from the scene shown in FIG. 3 is illustrated. Again, for reference, the antenna beam 37, field of view 42, and anticipated trajectory 36 of the subject vehicle 24 are shown. The control system 10 of the present invention generates a high resolution forward looking radar which is able to detect a wide variety of objects (38, 39, 40, and 41) as well as vehicles 35. The scene data resulting from the reflections from the manmade and natural roadside objects (38, 39, 40, and 41) is extracted from the radar return. This extracted scene data is combined to create a feature edge 43. The offset between the trajectory of the vehicle 36 and the feature edge 43 is used to predict the likely path of the vehicle 44.

Figure 5:
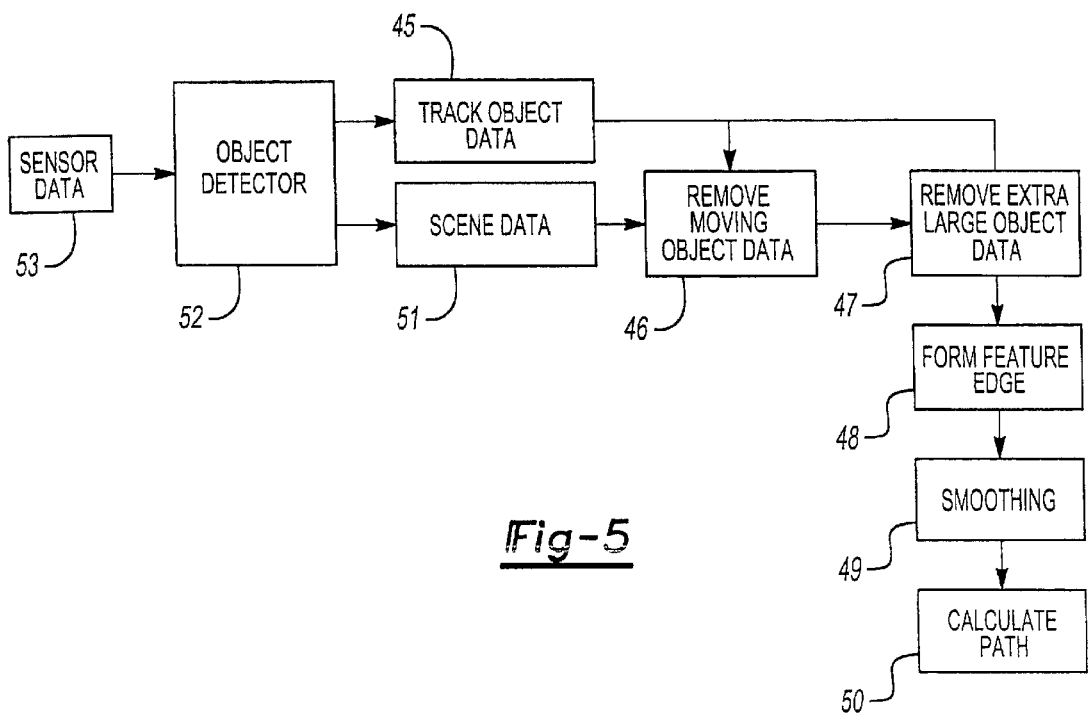
FIG. 5 illustrates the processing of data to perform the path prediction of the present invention.

FIG. 5 illustrates the processing of the data within the signal processor 19 for providing the path prediction of the subject vehicle 24. Sensor data 53 is processed through the receiver 18 (FIG. 1) and within the signal processor 19 (FIG. 1). Object detector 52 extracts the scene data for objects (i.e., 38, 39, 40, and 41) that is typically below the normal detection threshold for vehicles (35). The extraction of manmade and natural scene data is performed using multiple threshold analyses to classify the scene objects depending on whether they are vehicle size (35) or other sizes (38, 39, 40, and 41). Element 45 in FIG. 5 illustrates that the larger objects are tracked from sample to sample or frame to frame during scanning. This provides a classification of the objects based upon speed, position, range, extent, angle extent, size and trajectory. All objects are also detected and tracked through the scene data element 51.

The remove moving object data step 46 removes from the scene data 51 any objects that have been determined to be moving relative to absolute zero speed in the track object data step 45. This removal or extraction step is performed because moving objects are known to be vehicles and, therefore, cannot be roadside features such as 38, 39, 40, and 41.

The next processing of the data is the removal of extra large objects (47). This extraction step removes those objects which are not in proximity to other likely roadside objects such as 38, 39, 40, or 41. After the described extractions, the objects that are left in the scene data (51) are illustrated in FIG. 3.

If the other vehicle (28 in FIG. 2) is not moving, it would be extracted because it is a large object that is not in close proximity to other roadside objects 38, 39, 40, and 41. Conversely, if large objects (such as 40 in FIG. 3) were vehicles, they would not be removed from the scene data 51 because they are in proximity to other roadside objects 38, 39, 40, and 41.

The feature edge 43 is formed by looking at the manmade and natural objects (38, 39, 40, and 41) in each antenna beam 12. An imaginary line is drawn between objects 38, 39, 40, and 41 as shown in FIG. 4. If there are discontinuities, the points are extrapolated or interpolated and limits are placed on changes in the slope of the feature edge 43. After the formation of the feature edge (48 in FIG. 5), various types of smoothing 49 are applied to remove irregularities in the scene data.

Once the feature edge 43 is complete with smoothing applied (49), the likely path of the subject vehicle 24 can be estimated. The calculation of the path (50 in FIG. 5) is performed by examining the intersection between the antenna beam 12 and the feature edge 43. The offset between the feature edge 43 and the beam 12 is deemed to be a constant and the predicted path 44 is the offset from the feature edge 43. This produces an acceptable path prediction 44 on most roadways where manmade and natural scene objects (38, 39, 40, and 41) exist.

It is to be understood that the above-described embodiment is merely illustrative of one embodiment of the principles of the present invention. Other embodiments can be devised by those skilled in the art without departing from the scope of the invention.

What is claimed is:

1. A path prediction method for a vehicular sensing system comprising:

(a) scanning a forward field of view by transmitting and receiving radar signals through an oscillating antenna that is driven to oscillate back and forth at a predetermined angle in each direction;

(b) detecting a variety of objects in the field of view and generating object data information;

(c) extracting object data information which relates to non-vehicle objects;

(d) discarding said object data information which pertains to extra large objects not in proximity to likely roadside objects;

(e) forming a linear feature edge based upon the extracted non-discarded object data information;

(f) extrapolating or interpolating one or more portions of the feature edge when there are discontinuities in the extracted non-discarded object data information;

(g) performing one or more smoothing steps upon the feature edge after the feature edge is formed; and (h) determining a predicted path for a vehicle by using an offset with the feature edge.

2. The method of claim 1 wherein smoothing is applied to the feature edge to remove irregularities in the object data information.

3. The method of claim 1 wherein object data information is classified into different categories for determining the object data information to be extracted.

4. The method of claim 1 wherein the offset is a constant and the predicted path is the offset from the feature edge.

5. A sensing system including:

(a) an oscillating antenna scanner driven to oscillate back and forth at a predetermined angle in each direction while transmitting and receiving radar signals; and (b) a signal processor which receives object data information and which extracts from such object data information any non-vehicular data information, discards the extracted object data information that pertains to extra large objects not in proximity to likely roadside objects, forms a linear feature edge based upon the extracted non-discarded object data information, extrapolates or interpolates one or more portions of the feature edge when discontinuities exist in the extracted non-discarded object data information, and smoothes the feature edge according to one or more steps, wherein the feature edge is used for predicting the path of a vehicle.

* * * * *